United States Patent [19]

Ratliff

[11] 4,095,704
[45] * Jun. 20, 1978

[54] VEHICULAR DELIVERY RAMP APPARATUS

[75] Inventor: Roger D. Ratliff, Irving, Tex.

[73] Assignee: PepsiCo Inc., Purchase, N.Y.

[*] Notice: The portion of the term of this patent subsequent to Feb. 1, 1994, has been disclaimed.

[21] Appl. No.: 723,801

[22] Filed: Sep. 16, 1976

Related U.S. Application Data

[63] Continuation-in-part of Ser. No. 618,400, Oct. 1, 1975, Pat. No. 4,005,788.

[51] Int. Cl.² .............................................. B60P 1/48
[52] U.S. Cl. ................................. 214/77 P; 296/57 R
[58] Field of Search ................. 214/75 T, 77 R, 77 P, 214/152; 187/8.52, 97; 24/201 B; 292/251.5; 296/50, 57 R; 188/32; 49/29, 30

[56] References Cited

U.S. PATENT DOCUMENTS

| | | | |
|---|---|---|---|
| 2,052,119 | 8/1936 | Tear | 187/8.52 |
| 2,098,376 | 11/1937 | Cunneen | 187/8.52 |
| 2,435,729 | 2/1948 | Whann et al. | 292/251.5 X |
| 3,387,686 | 6/1968 | Little | 188/32 |
| 3,451,572 | 6/1969 | Rossoni | 214/77 P X |
| 3,722,140 | 3/1973 | Newton | 49/30 |
| 3,764,030 | 10/1973 | Randall | 214/77 P |
| 4,005,788 | 2/1977 | Ratliff | 214/77 P |

FOREIGN PATENT DOCUMENTS 842,783   7/1960   United Kingdom ................... 188/32

Primary Examiner—L. J. Paperner
Attorney, Agent, or Firm—Scully, Scott, Murphy & Presser

[57] ABSTRACT

A vehicular delivery ramp apparatus includes a cargo restraint device which is elevatable above the surface thereof into a position to prevent rolling or sliding motion of cargo deposited thereon. The cargo restraint device is a gate or planar bar vertically displaceable within a transverse slit formed in the deck portion of the ramp. The restraint device is controllably interengaged in operative relationship with an elevation structure for the ramp in order to provide fail-safe operation insuring that the restraint device is exposed to afford limitation or restraint of cargo movement.

9 Claims, 4 Drawing Figures

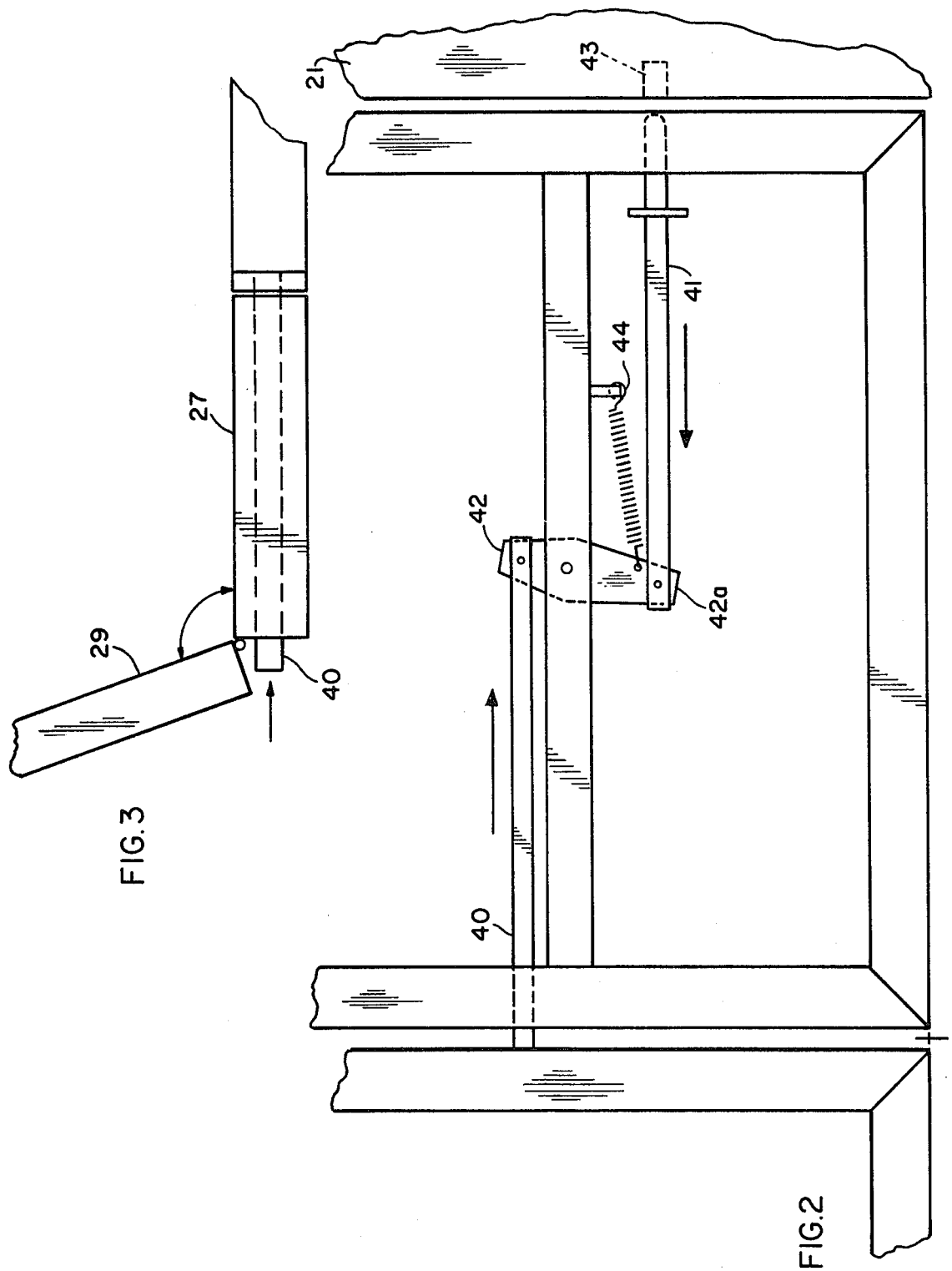

VEHICULAR DELIVERY RAMP APPARATUS

This application is a continuation-in-part application of Ser. No. 618,400; filed Oct. 1, 1975, now U.S. Pat. No. 4,005,788.

FIELD OF THE INVENTION

The present invention relates to systems including methods and apparatus for the facilitation of cargo handling in loading and unloading raised truck beds and the like. More specifically, there are disclosed improvements in elevator construction including control mechanisms for the handling of relatively heavy cargo.

Ramp type elevator constructions for the presentment of cargo at ground level or a selected height from a fixed load level are now commonplace, especially where relatively heavy goods are involved. Thus, the goods are shifted or rolled onto a rear or side ramp which is initially established at the load level, and then the entire ramp carrying the cargo is displaced vertically and sometimes horizontally into a position which is level with a loading platform, curb or the ground for further translocation or delivery.

In the case of major delivery stops involving the utilization of large tractor trailers and loading ramps, manpower and/or various labor saving devices, such as fork lifts or the like are readily available and even heavy cargo may be readily handled with relative ease and safety.

The more frequent delivery situation, however, is the small retail operation, where a few cases of goods are removed and returnables accepted at each location. Typically, this will necessitate the use of a van delivery with a side mounted elevator, because of parking space limitations and the concomitant necessity of curb side unloadings. Available manpower is sharply restricted, the common practice involving the employment of only a single driver-loader and, accordingly, safety considerations are emphasized.

Th above-mentioned situation is typified, without limitation in the handling of beverages packaged in either bottles and/or cans, and widely employing standard bulk carriers weighing up to 1400 lbs. when fully laden. These carriers are 72 inches in height and, accordingly, are inherently tippable in addition to being difficult to manipulate in view of their weights, particularly when handled by one man.

The critical handling phase is encountered as the carrier is removed from the truck proper and rolled onto the ramp, since the momentum which is developed may carry the cargo farther than desired, and passage along the angulated terminus required for these devices leading to ground level may cause tipping and loss of the payload.

It is often necessary for the carrier to be indexed into the ramp opening from the interior of the truck and accordingly essential that the carrier's forward motion be terminated surely and safely such that the driver may be able to relocate exteriorly of the truck for effectuating controlled unloading from the ramp.

Where the ramp elevation feature is called into play as for ground or curbside delivery, the cargo is again placed in motion and requires restraint against rolling from a stable position, particularly where the location is such that the truck bed cannot be maintained in a level configuration.

This invention deals with control mechanisms for cargo handling adapted to prevent indiscriminate rolling or sliding of cargo during loading and unloading operations from ramp beds.

DISCUSSION OF THE PRIOR ART

Devices of the above type are known, for example as disclosed in U.S. Pat. No. 3,764,030. Thus, in this case the patentee provides a roll-off preventing mechanism comprising a vertically shiftable gate member which is disengageable by lever action upon reaching the ground. This arrangement is desirably the subject of further improvements in design, especially for purposes of safety in operation, and for elevated delivery ramp postures.

BRIEF DESCRIPTION OF THE INVENTION

Accordingly, it is a primary object of the present invention to provide a fail-safe system for the temporary restraint in vehicular delivery ramps.

Another object of the present invention is to provide a delivery ramp incorporating a cargo restraint device which is selectively and temporarily elevatable above the upper surface of the former into a position to prevent rolling or sliding motion of a cargo deposited thereon.

Still another object of the present invention is to provide a unique and improved locking mechanism for a hydraulically controlled truck ramp leader.

A further object of the invention is to provide a method for the fail-safe deployment of a cargo restraint device in platforms for vehicular cargo delivery.

In accordance with the invention a vehicular delivery ramp is provided with a cargo restraint device which is elevatable above the surface thereof into a position to prevent rolling or sliding motion of cargo deposited thereon. An example of a cargo restraint device is a gate or planar bar vertically displaceable within a transverse slit in the deck portion of the ramp. The operation of the restraint member is controllably interengaged with elevation means for the ramp in order to provide fail-safe operation insuring that the restraint member is exposed to provide limitation or restraint of cargo movement.

The restraint mechanism comprises an extended weighted arm which is mounted for rotation about a fulcrum formed by a transversely mounted rod, the rotation of the rod mechanically effecting the vertical displacement of the planar bar portion constituting the cargo restraint, per se.

The cargo restraint bar may be physically displaced into a recessed position by simple mechanical depression, as by the foot of the operator. However, the weighted arm (usually, about a 3:1 weight ratio) leverages the restraint bar upwardly as soon as the depressing force is removed, except when the weight is relieved, by resting on the ground or any other loading surface.

Since the operator is generally fully engaged with the handling of the cargo during the unloading process, the invention provides an electromagnet locking device for maintaining the recessed position of the restraint bar, in effect, with the electromagnet energized, the restraint bar is lockingly engaged in the recessed position thereof.

In order to provide fail-safe operation, the electromagnet is energized only for a selected, limited period of time, and upon being automatically deenergized, the force maintaining the restraint bar in the recessed position is released, thereby effecting (by the weighted leveraging action) the automatic redeployment of the restraint bar into an active upstanding or elevated posture. A timed cycle of 20-40 seconds is usually suitable for the handling of a single item of cargo. This feature insures that the restraint mechanism is in place when the next piece of cargo is indexed onto the deck of the ramp for unloading.

In some instances, it may be desirable to disengage the restraint bar for longer periods of time, although the ramp is in an elevated position with an exposed undersurface such that the weighted leveraging action causes the restraint bar to be in the activated position. In such cases, the electromagnet may be energized manually and the restraint bar locked into a recessed position, however, an interlock provided by suitable control circuitry disengages the elevator such that it may not be moved (the same interlock operating at any time and for such length of time as the electromagnet is energized). The electromagnet cycle may be manually overriden to engage the elevator, but only by deenergizing the magnet, which automatically (by action of the counterbalance) redeploys the restraint bar.

BRIEF DESCRIPTION OF THE DRAWINGS

The invention may be further understood by reference to a detailed description of preferred embodiments thereof, taken in conjunction with the accompanying drawings, in which:

FIG. 2 is a plan view of a locking mechanism for the delivery ramp shown in FIG. 1;

FIG. 3 is a side elevational view of the locking mechanism of FIG. 2; and

DETAILED DESCRIPTION OF THE INVENTION

Figure 1:
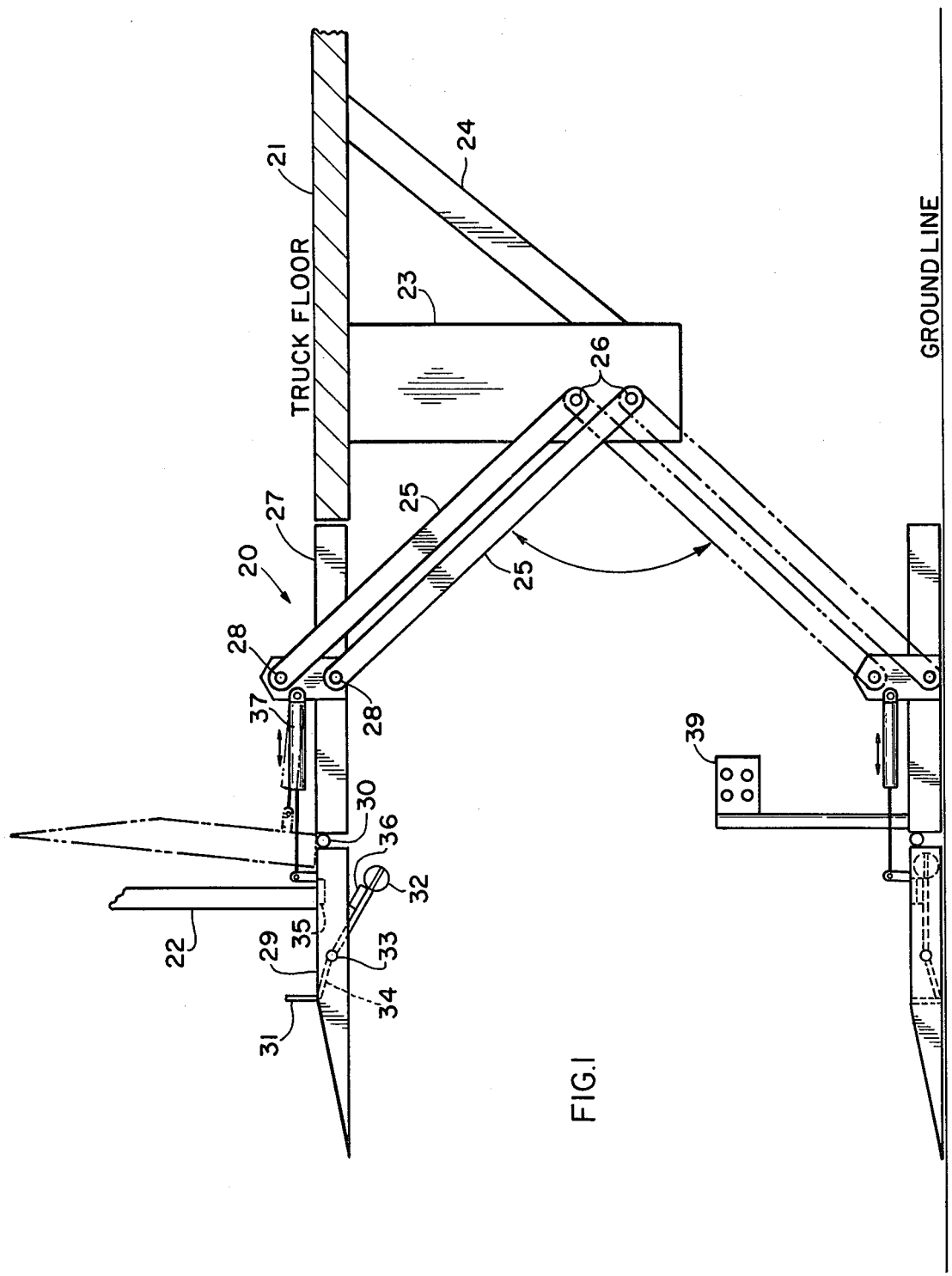
FIG. 1 is a side elevational view of the vehicular delivery ramp constructed in accordance with the present invention, shown in two operative positions thereof.

The truck floor or bed is of generally conventional construction employing suitable cantilevering and counterbalancing means for the side elevator mechanism except that a well or opening is formed at one side of the truckbed for insertion of the elevator and ramp devices, in effect, the floor is discontinuous to the extent of the dimensions of the ramp platform.

Suitably, the entire elevator and ramp structure is retracted into a recessed configuration in part by folding of the operative elements and in part by retraction from a horizontally extended position in such manner as not to extend beyond the well proper.

However, in both the extended and retracted configuration of the elevator and ramp structure, it is a feature of the present inventive device that no significant part of the supportive frame is located above the truck floor, so as to maximize freedom of translocation or movement of cargo within the truck.

The ramp, at one end thereof, comprises a flat platform or deck of generally rectangular configuration. In use, this portion of the ramp forms the upper support surface for cargo during operation of the elevator structure and is located for indexing of cargo thereupon in the well formed at the side of the truckbed in such manner as to substantially extend across the whole of the well and to fill out the truck floor. As the invention in its most preferred aspects is related to the delivery of beverage orders utilizing standard bulk carriers, the dimensions of the platform, and of the ramp, are selected to receive a 27 × 40 × 72 (h) inches carrier in either extended position.

The opposed portion of the ramp comprises an apron, or in section an elevated plane, which at its elevated portion is contiguous with the support platform and continuous therewith and at its recessed portion is contiguous and continuous with ground elevation of a loading platform, etc.

Typically the ramp affords a rolling length of 12-15 inches or defines an angle of inclination of 12° to 15°. The region below the surface may comprise no more than a shell adapted to receive necessary engineering support structural details.

During use the platform and inclined plane portions constitute an integral ramp employed for the loading and unloading of goods, but are hingedly mounted for arcuate dismounting towards engagement or contact between the respective upper surfaces for storage thereof within the truck well.

Of course, as occasioned in certain and sometimes preferred embodiments, the platform portion may extend somewhat beyond the hinge mounting. In fact, in a particularly preferred embodiment, having regard for the need to insure full retraction of the unit in transit and to provide a controllable hand hold from outside of the truck, the platform portion is ordinarily transected so that about two-thirds thereof falls within the truck proper and one-third or less thereof projects outwardly beyond the truck wall. However, in all such instances, the unit is hingedly or rotatably mounted and retracted in a manner whereby the entirety of the mechanism projecting beyond the truck side wall in use is disposed within its boundaries for transit.

The underlying surface will, in general, conform to conventional engineering design having regard for the functions performed by the structure.

The exception lies in that a region or space is provided for the mounting of the electromagnet in a recessed position adjacent one terminus of the arc of rotation of the counterbalance of the restraint mechanism in the position corresponding to a recessed gate or restraint bar. Commonly, the restraint mechansim is mounted about a rod journalled for rotation in a position extending transversely of the deck, with the restraint bar proper and its lever arm extending forwardly, in essence, towards the exterior, and with the counterbalance portion extending rearwardly.

The platform portion of the ramp adjacent the apron is provided with a transversely extending aperture or slit which is adapted to receive the restraint bar, and is ordinarily disposed in a normal plane, in effect, extending parallel to the side of the truck. The restraint bar is vertically extensible or displaceable in a freely movable manner through the slit in order to act as a stop barrier to the further movement of cargo when in an extended or raised relationship. The restraint bar itself is usually an upstanding planar metal structure of minor dimensions extending about two or three inches above the deck in its operative position. Conveniently, the bar may comprise one or more raised positions so as to be adapted for ready foot engagement by an operator.

Of course, the gate, barrier or restraint means may appropriately be constituted of a plurality of discontinuous members, such as stiff pins, or an intermeshed screen or the like, provided that such elements are adapted for ready and repetitive deployment and retraction. The restraint device is provided for operation with a payload of 1200–1500 lbs. carrier but, of course, is intended principally to control only rolling or sliding action involving lesser forces or loads of lower magnitude.

The electromagnet locking device generally is of a conventional design, and provides a perpendicular holding force in the magnitude of 75 pounds, drawing 12 volts and about 8 amps. The control circuitry also is conventionally and readily commercially available off-the-shelf. The controls are conveniently located in a well at the side of the truck, as well as in a mobile stand extending vertically from the platform when the operator rides the elevator. An interlocking circuit arrangement renders the mobile controls primary when in use.

The system is shut down, or effectively fully disengaged in order to avoid mishap in the retracted position, and is automatically reconnected when the covering overhead retracting door is fully opened, through activating of a toggle switch or like device.

In a further feature of the invention, locking bolts or pins are adapted to be received in the truck floor substructure at the inner side of the well. The pins are carried by the platform substructure and are mounted through an appropriate extension so as to be exposed at their opposite ends in the hinge lap of the apron. As the apron is lowered from its vertical stored position and assumes a horizontal position, the pin extensions are forced inwardly through suitable biasing means relieving and disengaging the opposed pin portions inserted within the flooring. Obviously, as the apron is retracted for storage, the pins are forced into engagement with the truck keying the platform into horizontal mating relationship.

Referring now to the embodiment FIG. 1, there is illustrated the inventive delivery ramp shown mounted on a truck van body consisting of a conventional chassis frame including a conventional floor structure 21, a side panel 22 with a loading door (not shown), and a floor cut-out or opening.

The delivery ramp of this invention includes a ramp generally indicated at 20, and is mounted to the underside of floor 21 through the intermediary of mounting bracket 23 which is supported by a support bar 24 through two sets of parallel arms attached to bracket 23 by inner pivot mounts 26, and attached to ramp 20 by outer pivot mounts 28. Ramp 20 is composed of a ramp deck 27 hingedly attached to ramp apron 29 through apron hinge 30.

Apron 29 is provided with planar restraint bar 31 which is vertically shiftable through a slot (not shown) extending laterally across the apron to a retracted or extended position by associated lever arm or counterbalance 32 pivotally connected to the apron by pivot 33. The counterbalance is provided with contact plate 36 for effecting contact with electromagnet 35, the latter of which is mounted on the underside of apron 29, for example, by means of a stud bolt or spring mount urging the electromagnet into contact with the contact plate 36 so as to restrain the activating movement of counterbalance 32 when desired.

Ramp apron 29 is also provided with hydraulic lift means 37 for lifting apron 29 into a generally perpendicular attitude with respect to ramp deck 27 when not in use, particularly to allow for closing of the door (not shown). A mobile control panel 39 is mounted on one side of ramp deck 27.

In operation, the delivery ramp of this invention is lowered and raised through the action of a conventional hydraulic system (not shown) by two hydraulic cylinders and associated hydraulic power system mounted on the underside of the truck floor, and through two sets of parallel arms 25 mounted on either side of the delivery ramp. The ramp apron can be lowered when convenient but is usually lowered by the associated hydraulic power system before the delivery ramp is lowered.

When the delivery ramp is lowered to a ground position (shown in dotted-line configuration in FIG. 1), counterbalance 32 is displaced upwardly and results in retraction of restraint bar 31 into the slot in apron 29. When the delivery ramp is raised, this permits counterbalance 32 to be displaced downwardly so as to extend restraint bar 31 upwardly above apron 29. However, when the delivery ramp is lowered to a platform or level, above ground level, the operator manually depresses the restraint bar (such as through fast action) and energizes the electromagnet which holds the counterbalance in "up" position through the contact plate, and thereby retains the restraint bar in a retracted position within apron 29. For convenience, a timer may be employed to deactivate the electromagnet after a predetermined period of time, after which the restraint bar will then assume the normal extended position. Suitably, the predetermined period of time can be a time period which is sufficient for allowing the operator to remove the cargo carrier from the ramp, for instance 20–40 seconds. Optionally, the timed sequence can be interrupted at any point by the mere expediency of shutting off the timer. The timer mechanism uses standard equipment and may be conveniently controlled by a simple on-off control which, along with the control provided for raising and lowering of the ramp, may be located on the delivery ramp as shown in FIG. 1.

When the delivery ramp is in a fully raised position, ramp deck 27 occupies the full dimensions of the floor opening and is conveniently provided with a locking mechansim to assure continuity and evenness of the truck floor surface. Referring to FIGS. 2 and 3 of the drawings, the locking mechanism is constituted of a push rod 40 which is journalled through the outer wall of ramp deck 27 and pivotally attached to a biasing arm 42, the latter of which is attached to a rib on the underside of the ramp deck. Similarly attached to bias arm 42a is lock rod 41 which is journalled through the rear wall of the ramp deck and is seated in a slot 43 formed in the slot frame of the truck flooring. As apron 29 is being lowered into planar configuration with the ramp deck, push rod 40 is engaged by the hinged edge of apron 29 which is being raised by its associated hydraulic system, spring tensioning means 44 returns lock rod 41 into slot 43, and push rod 40 assumes its original position.

In another variant of the invention, although the locking mechanism shown in and described with reference to FIGS. 2 and 3 of the drawings provides for a lock rod 41 which is adapted to engage in slot 43 in a movement generally parallel with that of push rod 40 and normal to truck floor 21, it is possible that the lock rod 41 be actuated at a slightly angled relationship with regard to push rod 40 and truck floor 21 so as to enhance the locking action or effect between the truck floor surface and the delivery ramp in the fully raised position of the latter.

Quite apparently, in order to assure the full support of the delivery ramp, there may be provided two such locking mechanisms, one on each side of the central longitudinal axis of the delivery ramp in a substantially mirror-image arrangement.

Figure 4:
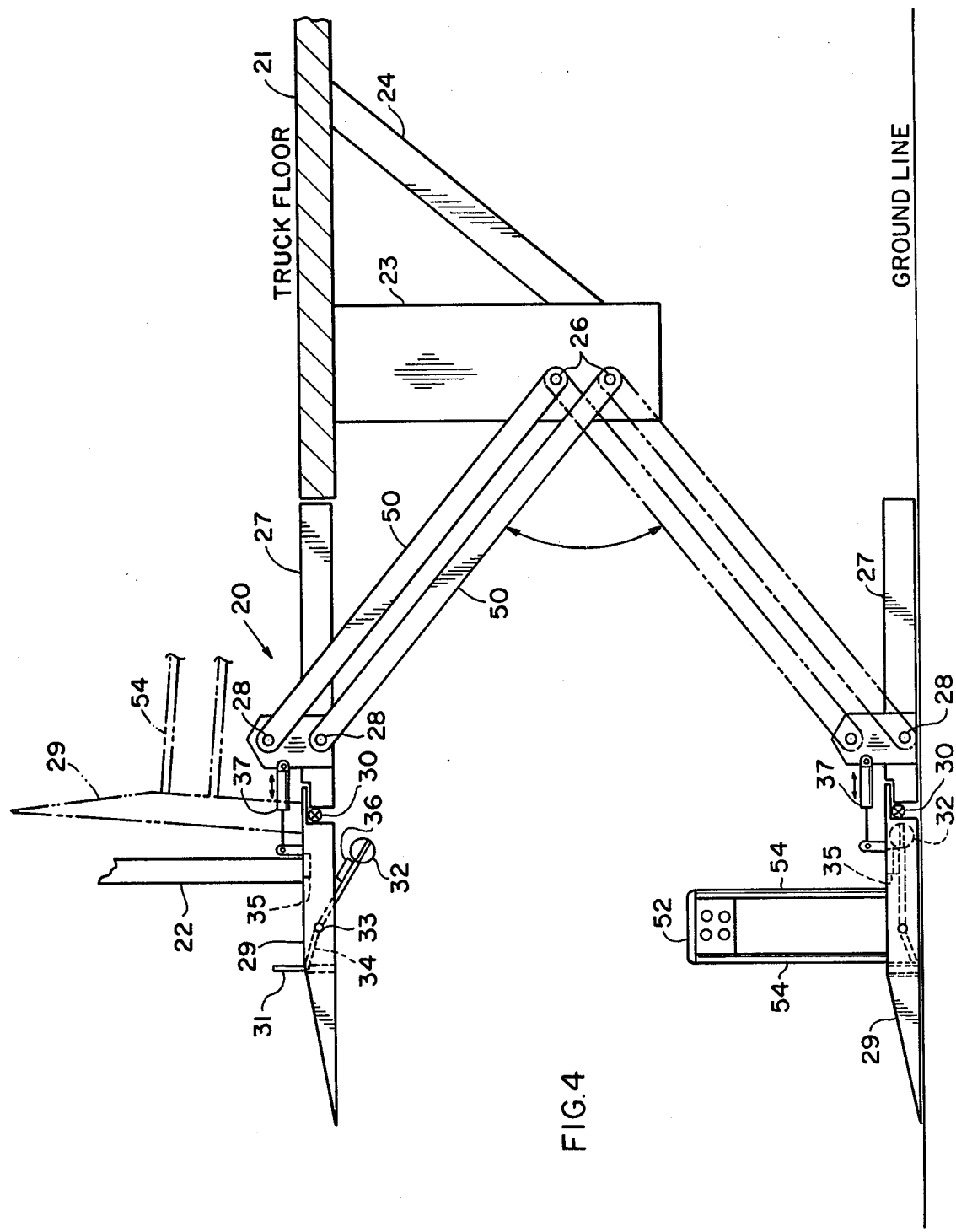
FIG. 4 is a side elevational view of a second embodiment of the vehicular delivery ramp.

Reference may now be had to FIG. 4 of the drawings, illustrating a somewhat modified and preferred embodiment of the delivery ramp shown in FIG. 1., in which similar or identical elements are designated by the same reference numerals.

In this embodiment of the delivery ramp, two sets of parallel arms 50, forming part of a conventional hydraulic system (not shown), are mounted on either side of the delivery ramp and have the opposite ends thereof attached to, respectively, the bracket 23 through the intermediary of inner pivot mounts 26, and to the sides of the ramp deck 27 in close proximity to the outermost edge thereof adjacent the near edge of apron 29 through intermediary of the outer pivot mounts 28.

A mobil control panel 52, supported between a pair of spaced uprights 54, is mounted on one side of apron 29, preferably although not necessarily centrally spaced intermediate the outer and inner end edges thereof.

In use, the embodiment of the delivery ramp illustrated in FIG. 4 operates generally in the same manner as that shown in FIG. 1 of the drawings. In this embodiment, attachment of the outer pivot mounts 28 to the outermost extended side edge portions of the ramp deck 27 rather than to the more inwardly located intermediate region of ramp deck 27 will reduce the angular extent of travel for the parallel arms 50 between their elevated and lowered positions.

Although the hydraulic lift means 37 is illustrated in both embodiment of the invention as being articulated to the brackets supporting outer pivot mounts 28, hydraulic lift means 37 may alternatively be incorporated into the frame structure of either ramp deck 27 or ramp apron 29.

For ease of description the present invention has been principally described relative to a truck for beverage delivery utilizing standard bulk carriers, however, it is understood that the cargo restraint system described has applicability generally to cargo handling in vessels of lading of all types, including trains, aircraft, merchant ships and the like; cargo of all kind and nature, including mail and comestibles; and delivery and pickup operations generally, as for franchise systems, and so forth.

What is claimed is:

1. In a ramp loading apparatus including a hydraulically controlled ramp loader for raising or lowering cargo to or from a truck floor bed, the improvement comprising: a recess formed in the upper surface of said ramp loader; cargo restraint means including a gate disposed within said recess of said loader; means for imparting vertical movement to said gate within said recess for selectively elevating said gate above and lowering below said surface; an electromagnetically actuatable counterbalance being disposed below said ramp loader; means for pivotally interconnecting said gate and said counterbalance so that spatial displacement of the counterbalance in one direction imparts a generally opposite spatial displacement to said gate; electromagnetical means for applying an electromagnetic field to said counterbalance upon said gate being lowered within said recess in said loader; and means for actuating said electromagnetic means so as to generate said electromagnetic field; said means for imparting said vertical movement to said gate being inoperative upon said electromagnetic means applying said electromagnetic field to said counterbalance for maintaining said gate in a recessed mode within said recess; and timing means for limiting the period of restraint of said gate in said recess by said counterbalance.

2. Apparatus as claimed in claim 1, said recess being a slot formed in said ramp loader and extending across substantially the width of said upper surface, said gate being vertically slidable within said slot between elevated and lowered positions.

3. Apparatus as claimed in claim 2, said gate comprising an elongate bar member.

4. Apparatus as claimed in claim 2, said gate comprising a plurality of stiff vertical pins, said pins being axially spaced within said slot.

5. Apparatus as claimed in claim 2, said gate comprising an intermeshed screen.

6. Apparatus as claimed in claim 1, said ramp loader comprising a generally horizontal ramp deck; an apron hingedly connected to said ramp deck; and hydraulically-actuated means for pivoting said apron relative to said ramp deck whereby said apron is angled with respect to said ramp deck in the transport made of said apparatus and is in horizontal coplanar relationship with said ramp deck in the cargo supporting made thereof.

7. Apparatus as set forth in claim 6 and including a hydraulic power system for operating the hydraulically controlled ramp loader, and at least one set of arms extending from said hydraulic power system to said ramp deck directly adjacent to where said apron is hingedly connected to said ramp deck.

8. Apparatus as claimed in claim 1 and including a mobil control panel mounted on one side of the ramp loader for controlling the operation thereof.

9. A vehicular delivery ramp adapted for elevated cargo delivery comprising a generally horizontal platform forming a cargo support surface; an elongate recess in said surface extending transversely thereof in the outermost region relative to said vehicle; cargo restraint means including a gate for freely movable vertical displacement within said recess between recessed and exposed positions relative to said cargo support surface; a counterbalance comprising magnetic material; rigid lever means interconnecting said gate and said counterbalance for movement in an opposed manner through a rod journalled for rotation in and about said platform so as to selectively expose and recess said gate through said recess in response to displacement of said counterbalance; electromagnetic means located to intersect the arc of rotation of the counterbalance at a point corresponding with the recessed position of said gate; means for energizing and electromagnetic means so as to generate an electromagnetic field; and timing means for de-energizing said electromagnetic means, said electromagnetic means electromagnetically restraining said counterbalance upon said counterbalance being rotated by manual depression of said gate into a position adjacent said electromagnetic means in an energized condition of the latter, said timing means disengaging a source of energy of said electromagnetic means after elapse of a preselected period of time, whereby said gate is rotated into an exposed position above said cargo support surface for cargo restraint.

* * * * *